(12) United States Patent
Meier

(10) Patent No.: US 6,702,222 B2
(45) Date of Patent: Mar. 9, 2004

(54) PROCESS AND DEVICE FOR WINDING THE FIELD COILS OF A DOUBLE-POLE STATOR

(75) Inventor: Konrad Meier, Watt (CH)

(73) Assignee: ATS Wickel-und Montagetechnik AG (CH)

(*) Notice: Subject to any disclaimer, the term of this patent is extended or adjusted under 35 U.S.C. 154(b) by 106 days.

(21) Appl. No.: 09/934,062

(22) Filed: Aug. 21, 2001

(65) Prior Publication Data
US 2002/0096594 A1 Jul. 25, 2002

(30) Foreign Application Priority Data
Jan. 19, 2001 (EP) ............................................ 01810051

(51) Int. Cl.$^7$ ............................................ H02K 15/085
(52) U.S. Cl. ..................................... 242/432.6; 29/596
(58) Field of Search ........................... 242/432.3, 432.6, 242/439.1, 439.2, 439.4; 29/596

(56) References Cited

U.S. PATENT DOCUMENTS

| 3,331,562 A | * | 7/1967 | Beauhausen | ............. | 242/432.6 |
| 4,340,186 A | | 7/1982 | Shimada et al. | | |
| 5,664,317 A | * | 9/1997 | Ponzio et al. | ................. | 29/596 |
| 6,010,362 A | | 1/2000 | Caviness et al. | | |
| 6,357,689 B1 | * | 3/2002 | Dolgas et al. | ............ | 242/432.6 |
| 6,467,718 B2 | * | 10/2002 | Stratico et al. | .......... | 242/433.4 |

FOREIGN PATENT DOCUMENTS

| DE | 40 37 953 | 6/1992 |
| EP | 0 829 944 | 3/1998 |
| GB | 2 199 195 | 6/1988 |
| WO | 99/35730 | 7/1999 |
| WO | 99/45625 | 9/1999 |

OTHER PUBLICATIONS

Patent Abstracts of Japan, vol. 1995, No. 07, Aug. 31, 1995 & JP 07 107686A, (Shibaura Eng Works Co Ltd), Apr. 21, 1995.
Patent Abstracts of Japan, vol. 007, No. 008, Jan. 13, 1983 & JP 57 166860A (Honda Giken Kogyo KK), Oct. 14, 1982.
Patent Abstracts of Japan, vol. 008, No. 053, Mar. 9, 1984 & JP 58 204746A (Matsushita Denki Sangyo KK), Nov. 29, 1983.

* cited by examiner

Primary Examiner—Emmanuel Marcelo
(74) Attorney, Agent, or Firm—Bachman & LaPointe, P.C.

(57) ABSTRACT

In a process for insertion of wire (30) in the form of a field coil (56) between the pole horns (38, 40) and the stator wall (36) of a double-pole stator (14) of an electric motor, the stator (14) consists of two stator halves (12a, b) and the wire (30) to form the coil (56) is inserted by way of a winding arm (16) rotating about a rotation axis (y) lying perpendicular to the stator axis (x), where during the winding process, for temporary formation of an enlarged insert groove (34, 35) for the wire (30), a winding accessory (32) is laid against the outer edge of the stator (14) and the free ends of the pole horns (38, 40) are covered with a wire guide sleeve (42).

Figure 1:
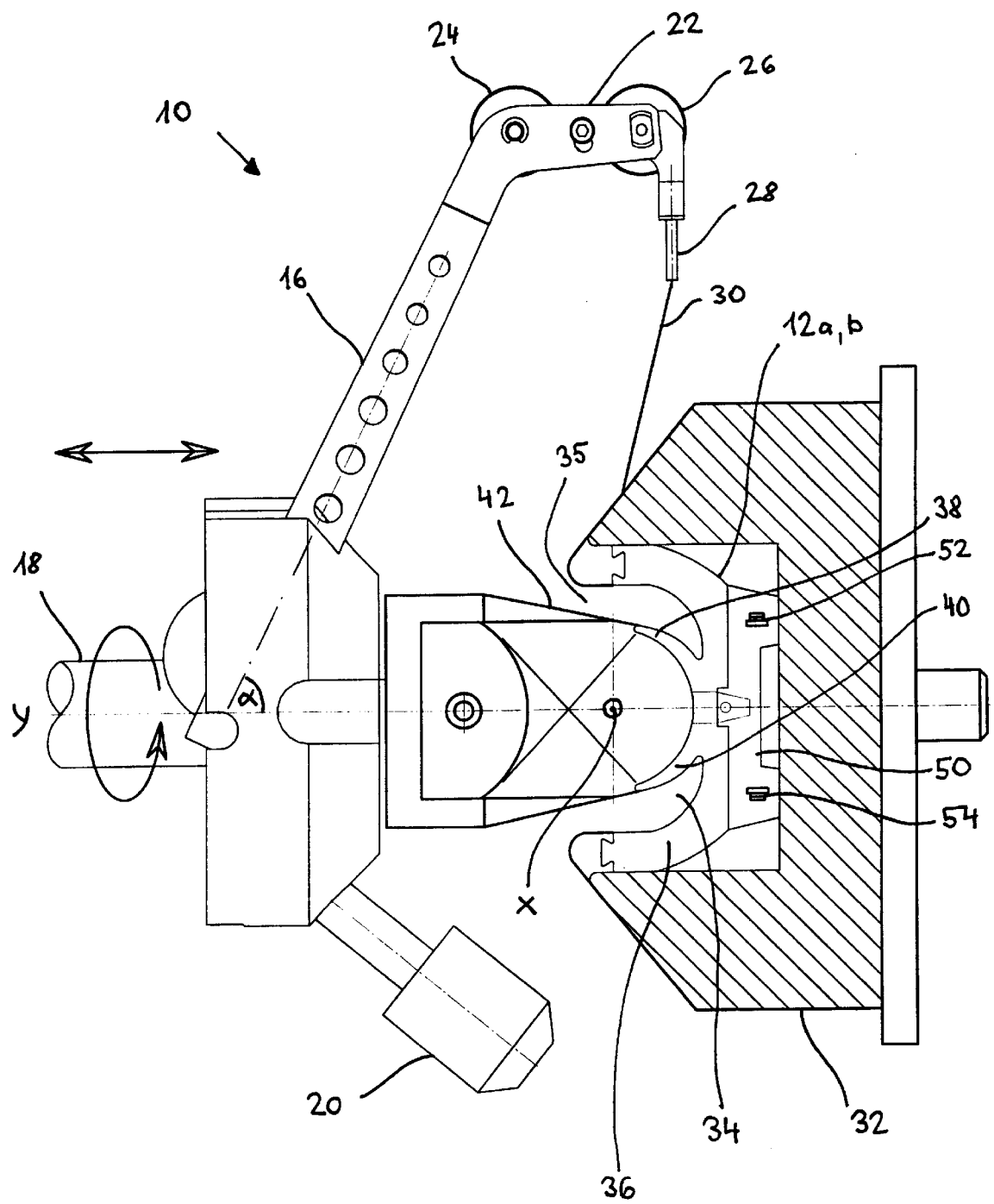

The process allows the winding of stators in which the pole horns largely cover the rotor external diameter of collector motors, leading to a higher motor power.

5 Claims, 3 Drawing Sheets

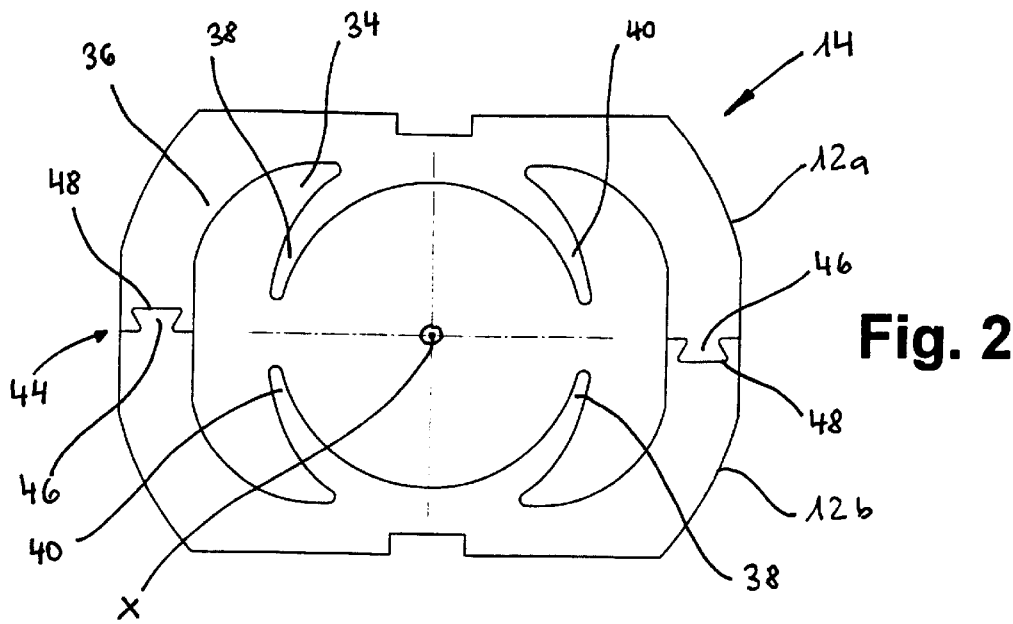
Fig. 2
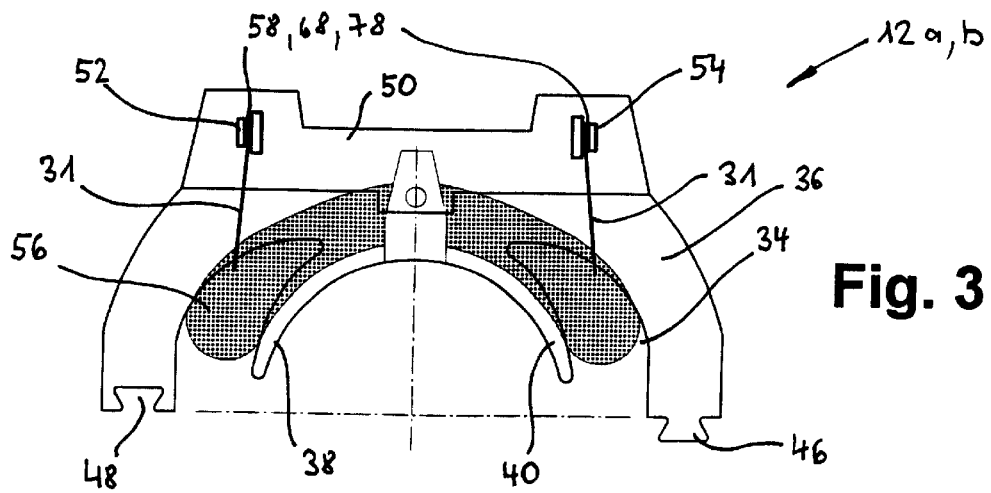
Fig. 3
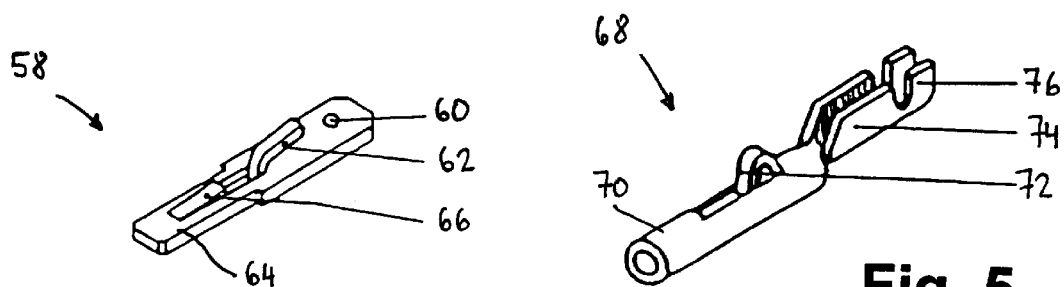
Fig. 4
Fig. 5
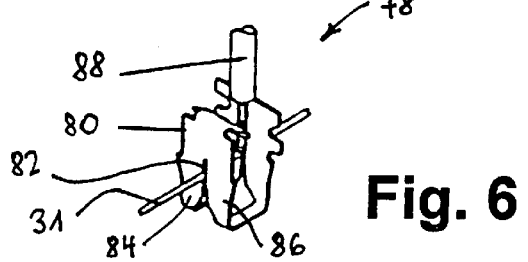
Fig. 6

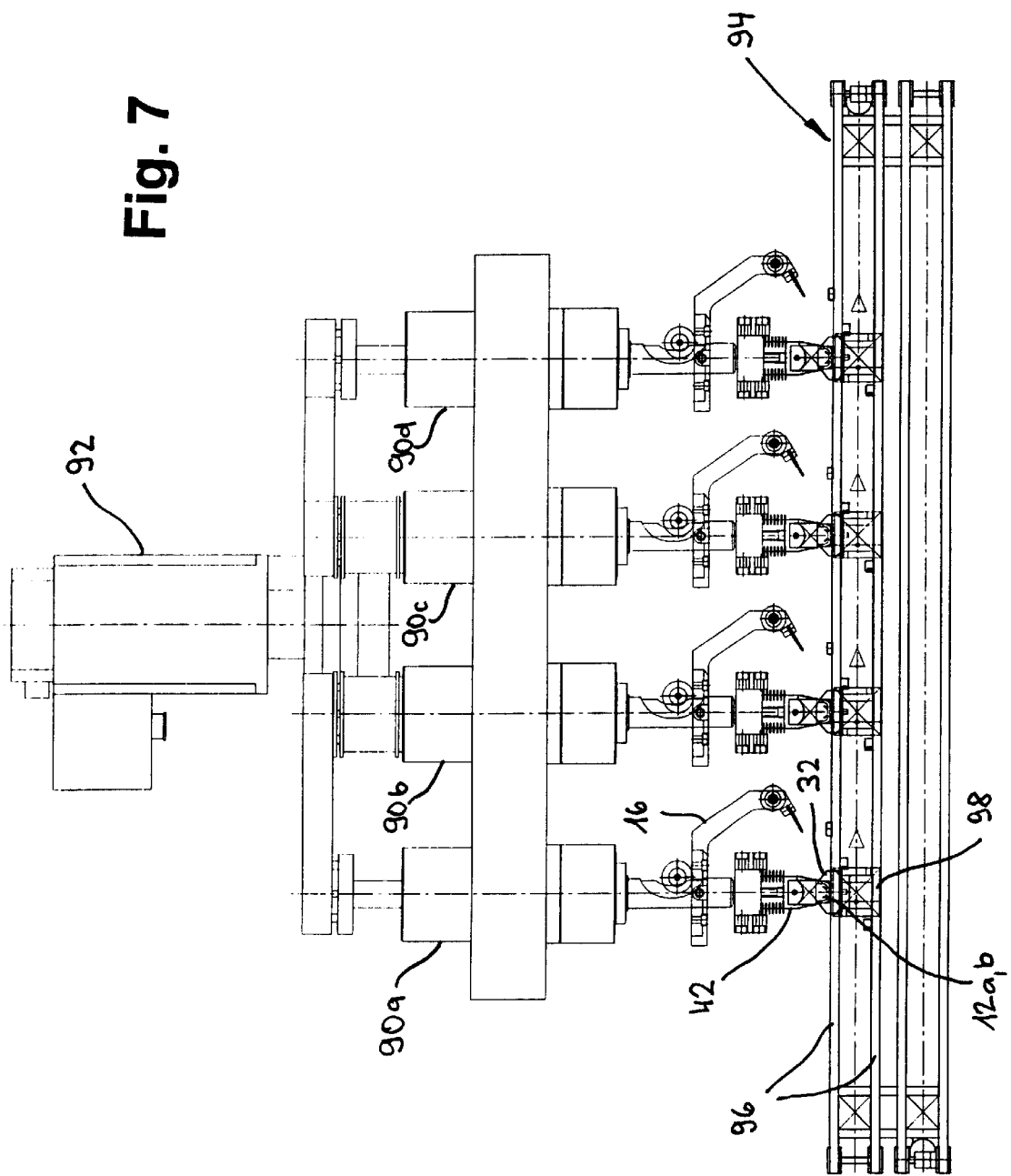

PROCESS AND DEVICE FOR WINDING THE FIELD COILS OF A DOUBLE-POLE STATOR

The invention concerns a process for the insertion of wire in the form of a field coil between the pole horns and the stator wall of a double-pole stator of an electrical machine. The invention also covers a device suitable for performance of the process and a plant for simultaneous winding of several stator halves.

Double-pole stators of electric motors with a collector rotor have a closed stator wall with two opposing pairs of pole horns which partly cover the external diameter of the collector rotor arranged in the central axis of the stator. The wire consisting of copper or the field coils made from this are arranged between the pole horns and the stator wall.

To wind the field coils of a single-piece double-pole stator, needle winding machines are known with which the two opposing field coils can be wound simultaneously directly in the grooves between the stator wall and the pole horns. Here the wire is threaded into the base of the groove over winding accessories. In a variant, winding takes place without winding accessories but with a controlled spreadable wire guide.

Another possibility for winding stators, in particular for small electric motors, is a two-piece double-pole stator known from DE-A-40 37 953. Here, the individual field coils are preproduced by winding on a multiple layer winding machine, the coil legs isolated and the connecting strands applied at the winding start and end. The field coils are inserted and fixed in the groove in the stator halves bordered by the stator wall and pole horns. The two halves are then joined together to form the stator.

Measurements on collector motors have shown that when the pole horns largely cover the rotor external diameter, on corresponding winding a high motor power results. Such a change in sheet cutting of stator stampings made for example by punch bundling of individual laminations would, in a single-piece and consequently closed stator, lead to the space between the pole horns no longer being sufficient for winding with the said needle winding machines.

The invention is based on the task of creating an efficient process of the type described initially and a device suitable for its performance.

To solve the task of the invention with regard to the process, the stator consists of two stator halves and the wire to form the field coil is inserted by way of a winding arm rotating about a rotation axis lying perpendicular to the stator axis, where during the winding process, for temporary formation of an enlarged insert groove for the wire, a winding accessory is laid against the outer edge of the armature stampings or stator and the free end of the pole horns are covered with a wire guide sleeve.

The core of the invention is to separate the sheet cut in the area of the neutral zone and insert the coils of the individual stator halves directly with a winding arm (flyer). In this way it is possible to wind several stator halves simultaneously. Furthermore, the geometric structure of the sheet cut for direct winding by means of a flyer results in a higher filling level of the groove with wire and a lower width, for example of the stator or armature stampings produced by punch bundling of individual laminations, which is advantageous, in particular, for the development of small electrical devices.

Further advantages of the process according to the invention lie in that the coil ends can be laid to terminals on the winding machine. Also, the punch-bundled stator halves can be oversprayed with plastic, which substantially simplifies the groove isolation.

Suitably, the winding arm and the wire guide sleeve can be moved along the rotation axis.

A suitable possibility for connecting the stator halves after winding is for each pair of stator halves to be assembled into a stator by way of a tongue and groove connection. To form the tongue and groove connection, for example each stator half can have a linear tongue of dovetail cross-section and a correspondingly under-cut linear groove.

Advantageously, at the side of each stator half is arranged a plastic body of electrically isolating material with connection elements for contact elements inset therein.

A device suitable for performing the process for winding wire field coils between the pole horns and stator wall of a double-pole stator of an electrical machine, the stator of which is formed in two parts for winding the field coils, is characterised by a winding arm rotatable about a rotation axis, a winding accessory to be laid during the winding process against the stator wall of the stator half to be wound, and a wire guide sleeve laid against the pole horns during the winding process, whereby the winding accessory and the wire guide sleeve form parts of an insert groove.

The winding arm and guide sleeve are preferably movable along the rotation axis.

For systematic production of stators, in particular a plant is suitable for simultaneous winding of several stator halves of two-piece double-pole stators of electrical machines. The plant has a multiplicity of winding stations corresponding to the devices described above and arranged along a transport device. The individual winding stations can preferably be driven by way of a common drive motor.

Further advantages, features and details of the invention arise from the description below of preferred embodiments and the drawing which shows diagrammatically:

FIG. 1 a partially cut side view of a station for winding double-pole stators for electric motors;

FIG. 2 the front view of a double-pole stator;

FIG. 3 the front view of part of the stator in FIG. 2 with inserted winding and isolation part with connection elements fitted at the side;

FIGS. 4–6 three different embodiments of contact elements which can be inserted in the connection elements;

FIG. 7 the top view of a plant with several winding stations for simultaneous winding of several stator halves.

A station 10 shown in FIG. 1 for winding a stator 14, divided in the axial direction x into two halves 12a, b and made for example by punch bundling of identical laminations into armature stampings, of an electric motor not shown in more detail, has a winding arm 16 which is arranged at an acute angle α to the rotation axis y on the axle shaft 18 of a drive unit not shown in the drawing. A counterweight 20 arranged on the side opposite the winding arm 16 serves to avoid imbalance during the rotating winding movement of the winding arm 16. On the free end of the winding arm 16 and rigidly connected with this sits a wire guide 22 with two deflector rollers 24, 26 and a wire outlet opening 28. A copper wire 30 is unwound from a storage roller not shown in the drawing, guided over deflector rollers 24, 26 of the wire guide 22 and thence through the wire outlet opening 28. The axle shaft 18 with attached winding arm 16 and wire guide sleeve 42 can move to and fro along rotation axis y.

The stator halves 12a or 12b to be wound are surrounded by a winding accessory 32 for winding. This winding accessory 32 serves to insert the wire 30 guided along its surface into the groove 34 of stator halves 12a, b bordered by the stator wall 36 and the pole horns 38, 40 remote from the stator wall 36. Whereas the winding accessory 32 guarantees a constant transition to the inner surface of the stator wall 36, the pole horns 38, 40 are surrounded by a wire guide sleeve 42 arranged in the rotation axis y so that the wire 30 is guided along the surface of the wire guide sleeve 42 into the groove 34. The groove 34 formed by the pole horns 38, 40 and stator wall 36 is, for simpler wire insertion, enlarged by the groove intake funnel 35 formed by the winding accessory 32 and the wire guide sleeve 42.

The two stator halves 12a, b should preferably be over-sprayed with plastic before the winding process to isolate the grooves 34.

As FIG. 2 shows, the two stator halves 12a, b can be joined together after winding to form stator 14. In the present example the connection is made by a tongue and groove arrangement 44, where each stator half 12a, b has at a connection point a linear tongue 46 of dovetail cross section and a correspondingly under-cut linear groove 48 on the other connection point. The two parts can either be pushed into each other sideways or clipped together if the tongue and groove connection 44 is suitably shaped. Naturally, there are many more suitable possibilities of connection systems for the two stator halves 12a, b.

According to FIG. 3 at the side of each stator half 12a, b is arranged a plastic body 50 of electrically isolating material. On this plastic body 50 sit two connection elements 52, 54 with contact elements arranged in these and described in more detail below, which firstly hold the free ends 31 of a field coil 56 formed by the wire 30, and secondly allow contact with a power source necessary for operation of the electric motor.

FIGS. 4 to 6 show various embodiments of contact elements or terminals 58, 68, 78 which are inserted in the connection elements 52, 54 of the plastic body 50.

The hook terminal 58 shown in FIG. 4 has a contact lug 60 for later contact with a power source, a contact hook 62 for clamping of the free ends 31 of the wire 30 of the field coil 56, and an insert 64 with a fixing part 66 projecting from this for anchoring the hook terminal 58 in the connection elements 52, 54.

A crimp terminal 68 shown in FIG. 5 has an insert part 70 with a fixing part 72 projecting from this for fixing the crimp terminal 68 in the connection elements 52, 54. Two channels 74, 76 of U-shaped cross section serve to hold the free ends 31 of the wire 30 of the field coil 56, where the freely projecting channel 76 serves as the first fixing of the wire 30. The actual contact of the wire 30 takes place on a crimp device by crimping the channel 74 with simultaneous cutting of the freely projecting channel 76.

FIG. 6 shows a so-called Mag-Mate terminal 78 which at its part 80 to be inserted in the connection elements 52, 54 is divided into two leg parts 84, 86 leaving a gap 82. On use of this Mag-Mate terminal 78, the free ends 31 of the wire of the field coil 56 are first inserted in the slot of the connecting elements 52, 54. When the terminal is inserted in the connection elements 52, 54, the free ends 31 of the wire 30 of the field coil 56 are held by the gap 82 of the terminal 78. By the pressure exerted by way of the leg part 84, 86 roughened on the inside, the insulation of the wire is destroyed and electrical contact created. The later electrical contact with the power source takes place by way of a further connection tab 88.

The free ends 31 of the wire 30 of the field coil 56 are inserted in the terminal for example by corresponding insertion movement of the winding arm 16. Depending on the design of the winding station 16, the winding wire 30 can for example also be inserted with a gripper.

The plant shown in FIG. 7 has for example four identical winding stations 90a, b, c, d arranged in series with a common drive motor 92. The winding accessories 32 with the stator halves 12a, b inserted therein are advanced on transport pallets 98 by means of a transport system 94 by way of conveyor belts 96 to the winding stations 90a, b, c, d in cycles and withdrawn again in cycles after winding.

What is claimed is:

1. Process for insertion of wire in the form of a coil between a plurality of pole horns and a stator wall of a double-pole stator of an electrical machine, characterized in that the stator consists of two stator halves and the wire to form the coil is inserted by way of a winding arm rotating about a rotation axis y lying perpendicular to the stator axis x, where during the winding process, for temporary formation of an enlarged insert groove for the wire, a winding accessory is laid against an outer edge of the stator and a plurality of free ends of the pole horns are covered with a wire guide sleeve.

2. Process according to claim 1, characterised in that the winding arm (16) and the wire guide sleeve (42) are movable along the rotation axis (y).

3. Process according to claim 1, characterised in that each pair of stator halves (12a, b) is joined together after winding by way of a tongue and groove connection (44) to form the stator (14).

4. Process according to claim 3, characterised in that to form the tongue and groove connection (44), each stator half (12a, b) has a linear tongue (46) of dovetail cross section and a correspondingly under-cut linear groove (48).

5. Process according to claim 1, characterised in that at the side of each stator half (12a, b) is arranged a plastic body (50) of electrically isolating material with connection elements (52, 54) for contact elements (58, 68, 78) which can be inserted therein.

* * * * *